Figure 1:
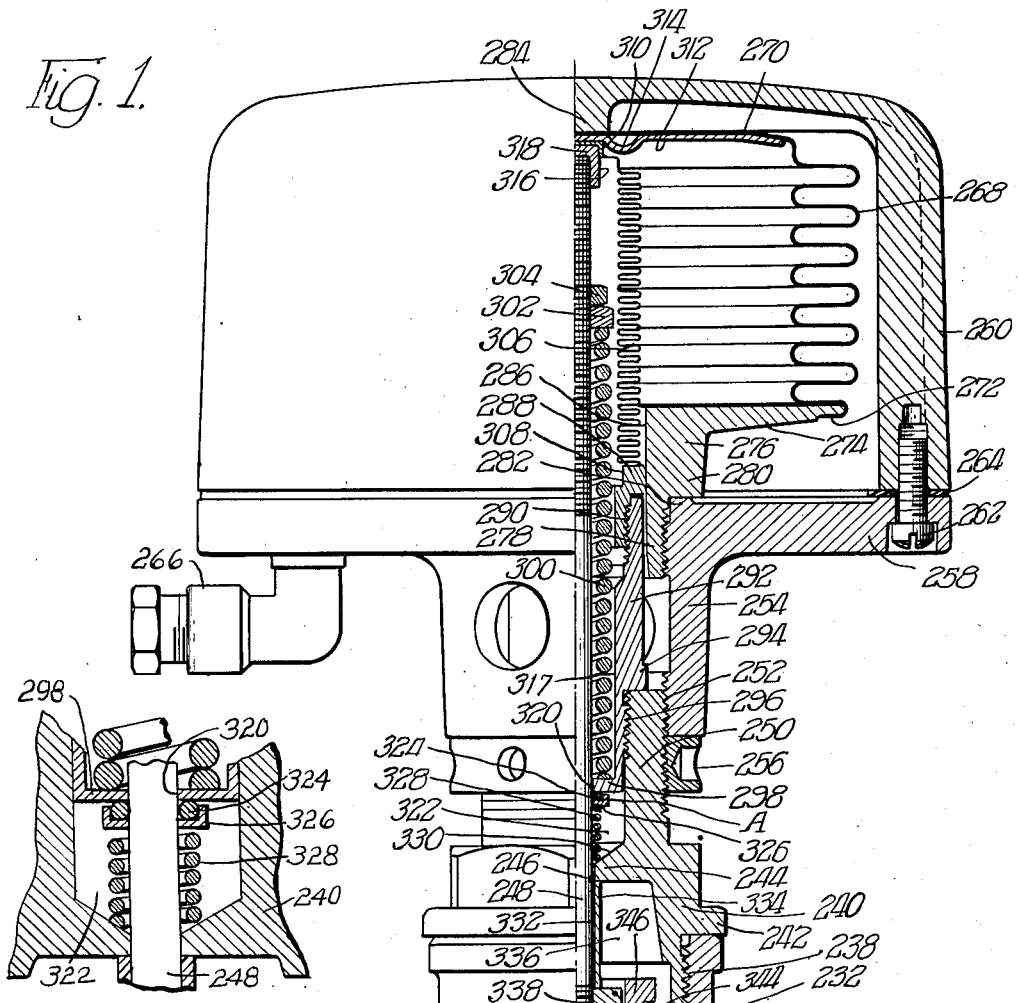

Oct. 6, 1953   D. H. THORBURN   2,654,394
PACKLESS VALVE
Filed June 29, 1950

INVENTOR.
David H. Thorburn,
BY
Wilkinson, Huxley,
Byron & Hume
ATTYS.

Patented Oct. 6, 1953

2,654,394

UNITED STATES PATENT OFFICE 2,654,394

PACKLESS VALVE

David H. Thorburn, Oak Park, Ill., assignor to The Powers Regulator Company, Chicago, Ill., a corporation of Illinois Application June 29, 1950, Serial No. 170,969

3 Claims. (Cl. 137—688)

This invention pertains to packless valve mechanism.

It is an object of this invention to provide valve mechanism which is of relatively simple construction, yet is capable of long life at low initial cost and low maintenance cost.

Another object of the invention is to provide a bellows type seal for valve mechanism, which may be used instead of the conventional packing seal, and is readily replaced in the event of failure.

Another object of the invention is to provide a bellows type seal for valve mechanism particularly operable by a fluid or other motor, wherein there is low hysteresis, and wherein one size bellows seal is adapted to fit a plurality of sizes of valve.

Another object of the invention is to provide packless valve mechanism having safety seal means operable upon main seal failure to prevent leakage prior to and during repair.

Another object of the invention is to provide packless valve mechanism wherein adjusting means is provided to give the best performance of the valve with the particular control mechanism with which it is associated.

Another object of the invention is to provide packless valve mechanism so constructed and arranged that several components of the valve, may become misaligned without causing stem friction.

Another object of the invention is to provide packless valve mechanism which is of compact size so as to readily fit in small spaces, being particularly adapted to fit in heating convectors.

Another object of the invention is to provide packless valve mechanism wherein a bellows seal is provided so disposed that it is out of the path of fluid flow whereby the bellows is not subject to erosion.

Another object of the invention is to provide a packless valve wherein a seal as an O ring seal is used to maintain an effective seal regardless of the position of the valve stem.

With these and various other objects in view, the invention consists of certain novel features of construction and operation as will be more fully described and particularly pointed out in the specification, drawings and claims appended hereto.

In the drawings, which illustrate an embodiment of the device and wherein like reference characters are used to designate like parts—

Figure 2:
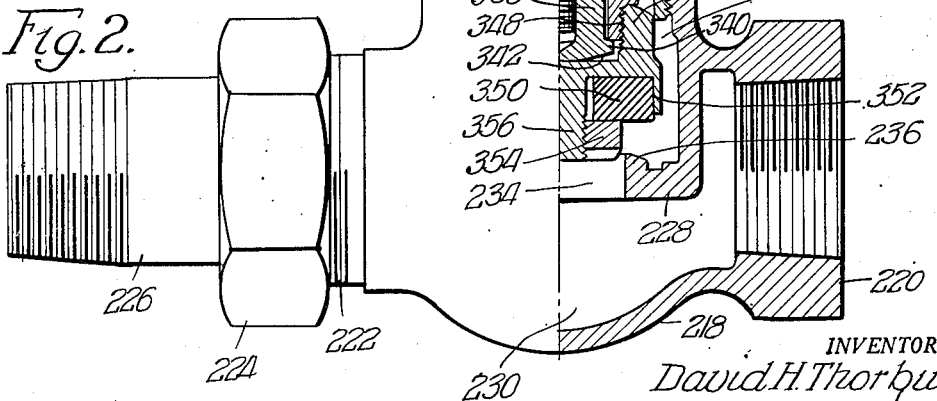

Figure 1 is a sectional elevation through a packless valve operating motor therefor embodying the invention; and Figure 2 is a sectional view illustrating in detail the O ring seal of Figure 1.

This application is a continuation-in-part of application Serial No. 97,117, filed June 4, 1949, now abandoned.

Referring now to the construction of valve illustrated in Figure 1, valve body 218 is provided with inlet fitting 220 threaded to an inlet connection (not shown). Valve body 218 is provided with threaded outlet 222 adapted to be connected through nut 224 to outlet connection or tail piece 226. As before, inlet and outlet may be reversed or of duplicate construction.

Valve body 218 is provided with wall 228 separating inlet chamber 230 from outlet chamber 232, the wall being provided with opening 234 provided with valve seat 236. Valve body 218 is internally threaded as at 238 for connection to complementary threads on bonnet 240, said bonnet forming a closure for outlet chamber 232, seating on the rim above threads 238 as by flange 242, shouldered or shaped to receive a wrench for assembly or disassembly. Bonnet 240 is provided with transverse wall portion 244 having passage 246 through which valve stem 248 slidably extends. Bonnet 240 is provided with the upwardly extending extension 250 externally threaded at 252 for connection to complementary threads provided on motor housing base 254, the base being adapted to be threaded on and thereafter prevented from accidental movement on extension 250 by means of the top lock nut 256, which is also threaded on external threads 252 of extension 250.

Motor housing base 254 is provided with the radially disposed base flange 258 to which motor housing top 260 is adapted to be connected by suitably spaced motor housing screws 262, gasket 264 being interposed between flange 258 and the rim of top 260. Base flange 258 is provided with fitting 266 adapted to be connected to a suitable source of operating fluid, whereby said fluid may be introduced into housing top 260 to actuate operating bellows 268, which is closed at its top end as at 270 and connected at its bottom end through flange 272 to the radial flange 274 of operating bellows base 276 which is threadedly secured as at 278 to flange 268, a shoulder 280 of said base 276 serving as a stop or positioning means for base 276, seating on shoulder 282 of flange 258.

Shoulder 282 forms a recess for the reception of the threaded extension of base 276, and housing top 260 is preferably provided with stop 284 for limiting the expanded (inoperative) position of bellows 268.

Bellows base 276 is provided with passage 286 into which the substantially cylindrical, packless bellows base 288 extends, said base being threadedly secured as at 290 to sleeve 292, which extends downwardly and has a shoulder 294 seating on the upper rim of extension 250, extending into and being threaded to said extension as at 296. The lower end of sleeve 292 terminates in a transverse sealing wall providing a spring seat 298, through which valve stem 248 extends, the lower end of spring 300 seating on said seat, and the upper end of said spring seating on adjustable spring seat 302, threaded to the upper part of stem 248, seat 302 being positioned by lock nut 304. Packless bellows 306 is provided with a lower open end suitably secured as at 308 to base 288, the opposite (upper) end 310 of said bellows being closed and being adapted to engage bellows thrust plate 312 which is preferably circular and provided with depending circular rib 314 embracing a portion of the closed end 310 of bellows 306, the opposite surface of plate 312 engaging the inner surface of closed end 270 of bellows 268.

The upper threaded end of valve stem 248 is provided with a nut 316 having a closed domed upper end 318 for engaging the inner surface of the closed end 310 of bellows 306. The upper ends of valve stem 248 and spring 300 are disposed within bellows 306, and said stem and spring pass through passage 317 of base 292, and said stem passes through passage 320 of seat 298 and through spring and seal space 322 of bonnet 240, and through passage 246 of said bonnet. O ring seal 324 is retained in cup or washer 326 which acts as a spring seat for the upper end of spring 328, the lower end of said spring being seated on seat 330 of wall 244. Seal 324 is arranged with washer 326 and spring 328 in such a way that it prevents flow of fluid from the valve body 218 and chambers 232 and 322 to the chamber within bellows 306. However, to obtain satisfactory operation, any fluid in bellows 306 must be permitted to escape downwardly when the valve stem 248 moves downwardly to valve closed position. Thus this construction acts as a seal through the O ring at all times, and should failure of bellows 306 occur no leakage of the fluid from the valve body will occur, unless the O ring also leaks. If this happens, the leakage will be very small and will act as an indication that bellows 306 should be replaced.

Stem 248 passes downwardly through passage 332 of stop sleeve or collar 334 provided in chamber 336 of bonnet 240, said sleeve 334 being disposed between the lower surface of wall 244 and the upper surface of stem head 338 secured to the lower end of stem 248. The lower end of head 338 is provided with flange 340 having lower substantially spherical surface 342.

Head 338 is secured to valve disk holder 344 by means of the nut 346 threaded to said holder 344 as at 348, flange 340 extending below the lower rim of nut 346, being disposed between said rim and holder 344. Valve disk 350 is disposed in disk recess 352, being held by nut 354 threaded to the lower extension 356 of holder 344.

In the valve structure described, the valve is open when valve member 350 is spaced from the valve seat 236, thereby permitting passage of liquid from inlet fitting 220 to outlet fitting 222 of the valve body 218. With the valve member in full open position the nut 316 will have moved the closed end 310 of collapsible bellows 306 upwardly, and due to its contact with the thrust plate 312 the closed end 270 of bellows 268 is likewise moved upwardly until engagement with stop 284 takes place.

Upon the introduction of pressure fluid to the inside of top 260 through fitting 266, the operating bellows 268 will be collapsed, moving the closed top 270 thereof downwardly. This downward or collapsing movement of the bellows 268 will cause a similar collapsing movement of the packless bellows 306 and consequently the valve stem 248 is moved in a direction to close the valve member. Should the operating pressure be relieved or reduced the coil spring 300 will effect opening of the valve member to a proportional extent.

The O ring seal maintains sealing contact with the valve stem 248 and with the transverse wall 298 and thus an effective seal is provided regardless of the position of the valve stem. Flow of liquid upwardly along the stem is prevented although the stem may reciprocate freely due to the expanding and contracting movements of the packless bellows. However, in time some liquid may work its way past the seal and should the same collect in said bellows to prevent collapsing movement thereof the coil spring 328 will yield, allowing escape of the liquid downwardly along the stem. Thus the O ring seal functions as a check valve to prevent upward liquid flow although permitting flow in an opposite direction under pressure.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a valve assembly, the combination of a casing having an inlet opening, an outlet opening and a valve seat therebetween, a valve member disposed in said casing for movement toward and away from the valve seat, a bonnet secured to said casing and providing a transverse wall portion, a stem for said valve member slidably extending through the transverse wall portion of the bonnet, said bonnet having an extension projecting above said wall portion, a motor housing base secured to said extension, a bellows assembly fixed to said motor housing base, a motor housing top secured to said base for enclosing said bellows assembly, means for introducing actuating fluid to said top externally of said bellows assembly, a cylindrical bellows base secured to said extension and extending within the bellows assembly, a collapsible bellows secured at one end to said cylindrical bellows base and extending into said bellows assembly, the other end of said bellows being closed, a bellows thrust plate interposed between the closed end of said bellows and said bellows assembly, said stem extending into said collapsible bellows and having a member provided with a bellows engaging surface for engaging the closed end of said collapsible bellows, a spring seat on said stem adjustable axially thereof, a coil spring having one end thereof in contact with the spring seat for applying tension to the stem for urging said collapsible bellows toward said bellows assembly thereby positioning said thrust plate, a transverse sealing wall provided by the cylindrical bellows base at its lower end opposite the collapsible bellows, said transverse sealing wall being located above the bonnet wall portion, said stem extending through the transverse sealing wall and which provides a seat for the lower end of the first mentioned spring, an O ring seal surrounding said stem and being located below the transverse sealing wall in contact with the underside thereof, a spring seat for retaining the said O ring seal, and a second coil spring between said bonnet wall portion and last named spring seat for urging said O ring into contact with the transverse sealing wall.

2. In a valve assembly, the combination of a casing having an inlet opening, an outlet opening and a valve seat therebetween, a valve member disposed in said casing for movement toward and away from said seat, a bonnet secured to said casing and providing a transverse wall portion, a stem for said valve member slidably extending through said wall portion, said bonnet having an extension projecting above the wall portion thereof, a cylindrical bellows base secured to said extension and having surrounding relation with the stem, a collapsible bellows secured at one end to said cylindrical bellows base and having a closed opposite end, said stem extending into the collapsible bellows and having means providing a bellows engaging surface for engaging the closed end of said bellows, a spring seat on said stem, a coil spring surrounding the stem and having one end in contact with the spring seat for applying tension to the stem for urging the stem in a direction to expand the collapsible bellows, a transverse sealing wall provided by the cylindrical bellows base at its lower end opposite the collapsible bellows, said transverse sealing wall being located above the bonnet wall portion, said stem extending through the transverse sealing wall and which provides a seat for the lower end of the first mentioned spring, an O ring seal surrounding said stem and being located below the transverse sealing wall in contact with the underside thereof, a spring seat for retaining the said O ring seal, and a second coil spring between said bonnet wall portion and the last named spring seat for urging said O ring into contact with the transverse sealing wall.

3. In a valve assembly, the combination of a casing having an inlet opening, an outlet opening and a valve seat therebetween, a a valve member disposed in said casing for movement toward and away from said seat, a bonnet secured to said casing and providing a transverse wall portion, a stem for said valve member slidably extending through said wall portion, said bonnet having a tubular extension projecting above the wall portion thereof, a collapsible bellows which at one end has securement to the extension and has a closed opposite end, said stem extending into the collapsible bellows and having means providing a bellows engaging surface for engaging the closed end of said bellows, a spring seat on said stem, a coil spring surrounding the stem and having one end in contact with the spring seat for applying tension to the stem for urging the stem in a direction to expand the collapsible bellows, a transverse sealing wall extending transversely of the extension above the said bonnet wall portion, said stem extending through the transverse sealing wall and which provides a seat for the lower end of the first mentioned spring, means for collapsing the collapsible bellows against the tension of said first mentioned spring and which effects movement of the stem to close the valve member, an O ring seal surrounding said stem and being located below the transverse sealing wall in contact with the underside thereof, a spring seat for retaining the said O ring seal, and a second coil spring between said bonnet wall portion and the last named spring seat for urging said O ring into contact with the transverse sealing wall.

DAVID H. THORBURN.

References Cited in the file of this patent

UNITED STATES PATENTS

| Number | Name | Date |
|---|---|---|
| 774,985 | Jones | Nov. 15, 1904 |
| 1,585,479 | Fisher | May 18, 1926 |
| 1,585,732 | Otto et al. | May 25, 1926 |
| 1,589,288 | Hansen | June 15, 1926 |
| 1,992,902 | McIntosh | Feb. 26, 1935 |
| 2,001,251 | Irving | Mar. 14, 1935 |
| 2,011,220 | Henning | Aug. 13, 1935 |
| 2,233,395 | Blanchard | Mar. 4, 1941 |
| 2,306,903 | Ray | Dec. 29, 1942 |